United States Patent
Nakai et al.

[11] Patent Number: 5,008,328
[45] Date of Patent: Apr. 16, 1991

[54] AQUEOUS ORGANOSILICON RESIN COATING COMPOSITIONS

[75] Inventors: Noboru Nakai, Hiratsuka; Osamu Isozaki, Yokohama, both of Japan

[73] Assignee: Kansai Paint Co., Ltd., Hyogo, Japan

[21] Appl. No.: 313,367

[22] Filed: Feb. 21, 1989

Related U.S. Application Data

[63] Continuation of Ser. No. 895,098, Aug. 11, 1986, abandoned.

[30] Foreign Application Priority Data

Aug. 21, 1985 [JP] Japan .................. 60-183275

[51] Int. Cl.$^5$ .................. C08K 5/06; C08K 83/08
[52] U.S. Cl. .................. 524/759; 524/761; 524/767; 524/769; 524/837; 524/838; 524/588; 528/28
[58] Field of Search ............... 524/800, 837, 838, 588, 524/759, 761, 767, 769; 528/28; 556/425; 525/474

[56] References Cited

U.S. PATENT DOCUMENTS

| | | | |
|---|---|---|---|
| 3,389,160 | 6/1968 | Reid | 528/38 |
| 3,565,936 | 2/1971 | Morehouse | 528/28 |
| 3,949,140 | 4/1976 | Biefeld | 528/28 |
| 4,417,066 | 11/1983 | Westall | 528/38 |
| 4,485,130 | 11/1984 | Lampin et al. | 427/387 |
| 4,490,356 | 12/1984 | Sebaj et al. | 424/70 |
| 4,495,322 | 1/1985 | Liebler | 524/198 |
| 4,634,756 | 1/1987 | Mishra et al. | 528/38 |

FOREIGN PATENT DOCUMENTS 1006729 10/1965 United Kingdom ............... 556/425

Primary Examiner—John C. Bleutge
Assistant Examiner—R. Dean, Jr.
Attorney, Agent, or Firm—Armstrong, Nikaido, Marmelstein, Kubovcik & Murray

[57] ABSTRACT

This invention provides an aqueous organosilicon resin coating composition comprising:

(I) an aqueous organosilicon resin which is a condensation product and which contains a quaternary ammonium base, the condensation product being prepared from (i) an organosilicon compound represented by the formula

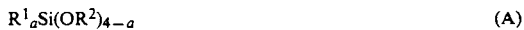

$$R^1{}_a Si(OR^2)_{4-a} \qquad (A)$$

wherein $R^1$ is hydrocarbon group having 1 to 12 carbon atoms, $R^2$ is hydrocarbon group having 1 to 8 carbon atoms and $a$ is 0, 1 or 2, and/or a low condensate thereof and (ii) an organosilicon compound represented by the formula

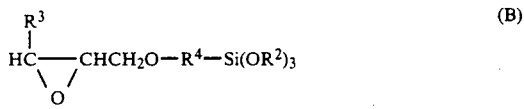

(B)

wherein $R^3$ is hydrogen atom or methyl group, $R^4$ is bivalent hydrocarbon group having 1 to 8 carbon atoms and $R^2$ is as defined above, and/or a low condensate thereof and, (II) an aqueous medium.

17 Claims, No Drawings

AQUEOUS ORGANOSILICON RESIN COATING COMPOSITIONS

The application is a continuation of application Ser. No. 895,098 filed Aug. 11, 1986, now abandoned.

This invention relates to aqueous organosilicon resin coating compositions, and more particularly to aqueous organosilicon resin coating compositions which are composed of an aqueous organosilicon resin as a binder having a quaternary ammonium base in the resin skeleton and which are capable of giving coats of high water resistance.

The term "aqueous" is used herein and in the appended claims in respect of organosilicon resin to represent not only resins dissolved in water to form a solution but also to resins stably and finely dispersed in water in the form of a colloid or micelle.

Resins frequently heretofore used as binders for aqueous organosilicon resin coating compositions include water-soluble organopolysiloxane resins such as water glass, and water-dispersible organopolysiloxane resins such as colloidal silica, silicone resin dispersed in water in the presence of a surfactant and the like.

However, the coating compositions having incorporated therein such water-soluble or water-dispersible organopolysiloxane resin as a binder have the drawback of giving a coat wherein the sodium ions or like paired ions and the surfactant remains, thus being unable to form a desired water-resistant coat.

It is an object of this invention to provide an aqueous organosilicon resin coating composition capable of forming a coat of high water resistance.

These and other objects and features of the invention will become apparent from the following description.

This invention provides an aqueous organosilicon resin coating composition comprising:

(I) an aqueous organosilicon resin which is a condensation product and which contains a quaternary ammonium base, the condensation product being prepared from (i) an organosilicon compound represented by the formula

$$R^1{}_a Si(OR^2)_{4-a} \qquad (A)$$

wherein $R^1$ is hydrocarbon group having 1 to 12 carbon atoms, $R^2$ is hydrocarbon group having 1 to 8 carbon atoms and a is 0, 1 or 2, and/or a low condensate thereof and (ii) an organosilicon compound represented by the formula

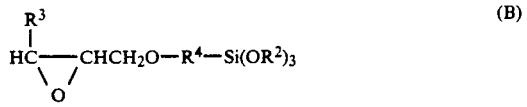

$$\underset{\underset{O}{\diagdown \diagup}}{HC\!-\!\!-\!\!CHCH_2O\!-\!R^4\!-\!Si(OR^2)_3} \overset{R^3}{|} \qquad (B)$$

wherein $R^3$ is hydrogen atom or methyl group, $R^4$ is bivalent hydrocarbon group having 1 to 8 carbon atoms and $R^2$ is as defined above, and/or a low condensate thereof and, (II) an aqueous medium.

The coating composition of the invention can be applied by usual application methods. It is curable at room temperature due to the catalytic action of the quaternary ammonium base present in the aqueous organosilicon resin used as a binder and can give a coat of sufficient water resistance. The baking of the coat formed from the coating composition causes the quaternary ammonium base to undergo thermal decomposition which results in removal of the polar group from the coat, further improving the water resistance of the coat. The coating composition stored at 50° C. for one month indicates the freedom from gelation and increase of viscosity, hence outstanding in storage stability.

Examples of hydrocarbon groups having 1 to 12 carbon atoms and represented by $R^1$ in the formula (A) are straight chain or branched chain alkyl groups having 1 to 12 carbon atoms such as methyl, ethyl, propyl, isopropyl, isobutyl, tert-butyl, hexyl, octyl and the like; aryl groups having 6 to 12 carbon atoms such as tolyl, xylyl, ethylphenyl, diethylphenyl, propylphenyl and like phenyl groups substituted with 1 to 3 alkyl groups having 1 to 6 carbon atoms on the phenyl ring, phenyl, naphthyl and the like; and cycloalkyl groups having 3 to 8 carbon atoms such as cyclobutyl, cyclopentyl, cyclohexyl, cycloheptyl, cyclooctyl, methylcyclohexyl and the like. Of these hydrocarbon groups, preferable are straight chain or branched chain alkyl groups having 1 to 12 carbon atoms, and more preferable are alkyl groups having 1 to 4 carbon atoms such as methyl ethyl, butyl, isobutyl and the like.

When a is 2 in the formula (A), the hydrocarbon group $R^1$ is the same or different.

Examples of hydrocarbon groups having 1 to 8 carbon atoms and represented by $R^2$ in the formula (A) are straight chain or branched chain alkyl groups such as methyl, ethyl, propyl, butyl, isobutyl, tert-butyl, hexyl, octyl and the like; aryl groups having 6 to 8 carbon atoms such as tolyl, xylyl, ethylphenyl and like phenyl groups substituted with 1 or 2 alkyl groups having 1 or 2 carbon atoms on the phenyl ring, phenyl and the like; and cycloalkyl groups having 3 to 8 carbon atoms such as cyclobutyl, cyclopentyl, cyclohexyl, cycloheptyl, cyclooctyl, methylcyclohexyl and the like. Of these hydrocarbon groups, preferable are straight chain or branched chain alkyl groups having 1 to 8 carbon atoms and more preferable are alkyl groups having 1 to 3 carbon atoms such as methyl, ethyl, propyl and the like.

Examples of organosilicon compounds represented by the formula (A) are tetramethoxysilane, tetraethoxysilane, tetrapropoxysilane, tetrabutoxysilane, tetraphenoxysilane, methyltrimethoxysilane, methyltriethoxysilane, phenyltrimethoxysilane, phenyltriethoxysilane, dimethyldimethoxysilane, diphenyldiethoxysilane, isobutyltrimethoxysilane, isobutyltriethoxysilane, diisobutyldimethoxysilane, diisobutyldipropoxysilane, ethyltrimethoxysilane, etc.

The low condensate of organosilicon compound represented by the formula (A) is an oligomer having a polymerization degree of up to 10. Such low condensate can be easily prepared by adding an acid to a mixture of the organosilicon compound of the formula (A) and less than equivalent amount of water relative to the alkoxy group in the organosilicon compound and reacting them at a temperature of about 20° to about 140° C. for about 30 minutes to about 6 hours. Examples of useful acids are hydrochloric acid, sulfuric acid, phosphoric acid and like mineral acids, formic acid, acetic acid and like organic acids, etc.

The examples given above of hydrocarbon groups having 1 to 8 carbon atoms and represented by $R^2$ in the formula (A) can be mentioned as the examples of the counterparts in the formula (B). Exemplary of bivalent hydrocarbon groups having 1 to 8 carbon atoms and represented by $R^4$ are straight chain or branched chain alkylene groups such as methylene, ethylene, propylene, butylene, isobutylene, hexylene and the like phenylene group: ethylphenylene, methylphenylene, dimethylphenylene and like phenylene groups substituted with 1 or 2 alkyl groups having 1 or 2 carbon atoms on the phenyl ring: and cycloalkylene groups having 3 to 8 carbon atoms such as cyclobutylene, cyclopentylene, cyclohexylene, cycloheptylene, cyclooctylene, methylcyclohexylene and the like. Of these hydrocarbons, preferable are straight chain or branched chain alkylene groups having 1 to 8 carbon atoms and more preferable are propylene and butylene.

Examples of organosilicon compounds represented by the formula (B) are γ-glycidoxypropyltrimethoxysilane, γ-glycidoxypropyltriethoxysilane, γ-glycidoxybutyltrimethoxysilane, γ-glycidoxybutyltriethoxysilane, γ-glycidoxypropyltripropoxysilane, 3-(2,3-epoxybutoxy)propyltrimethoxysilane, 3-(2,3-epoxybutoxy)propyltriethoxysilane, etc.

The low condensate of organosilicon compound represented by the formula (B) is an oligomer having a polymerization degree of up to 10. Such low condensate can be easily prepared, for example, by the same process as that for preparing the low condensate of organosilicon compound of the formula (A).

The quaternary ammonium base-containing aqueous organosilicon resin to be used as the component (1) in this invention can be prepared by various processes. Typical processes include, for example, (1) a process comprising reacting a tertiary amine compound with a reaction product of the organosilicon compound of the formula (A) or its low condensate and the organosilicon compound of the formula (B) or its low condensate, (2) a process comprising reacting the organosilicon compound of the formula (A) or its low condensate, the organosilicon compound of the formula (B) or its low condensate and a tertiary amine compound at the same time, and (3) a process comprising the steps of reacting a tertiary amine compound with the organosilicon compound of the formula (B) or its low condensate and further reacting the resulting reaction product with the organosilicon compound of the formula (A) or its low condensate.

The process (1) will be more specifically described below. Mainly hydrolysis and condensation reaction occur by reacting the organosilicon compound of the formula (A) or its low condensate with the organosilicon compound of the formula (B) or its low condensate. For example, the reaction is conducted by the following method. The two compounds are mixed together in the specific proportions and water is added to the mixture so that hydrolysis and condensation reaction proceeds simultaneously. It is preferred to incorporate an acid into the reaction system, examples of the acid being hydrochloric acid, sulfuric acid, phosphoric acid and like mineral acids, formic acid, acetic acid and like organic acids, etc. The amount of the acid is not specifically limited but can be suitably determined over a wide range. When required, the reaction system may further contain an aqueous solvent such as methanol, ethanol, isopropanol, diacetone alcohol and like alcohol solvents, cellosolve, methyl cellosolve, butyl cellosolve, methyl cellosolve acetate and like cellosolve solvents, etc.

The organosilicon compound of the formula (A) or its low condensate and the organosilicon compound of the formula (B) or its low condensate are used in a ratio of the former to the latter of about 50-about 99.5: about 0.5-about 50 (mole %), preferably about 80-about 99: about 1-about 20 (mole %). If less than 50 mole % of the former is present, a larger content of the quaternary ammonium base than is needed remains in the coat formed from the coating composition with the quaternary ammonium base-containing aqueous organosilicon resin as a binder, resulting in tendency to reduce the water resistance of coat formed by drying at room temperature, hence undesirable. Over about 99.5 mole % of the former reduces the content of quaternary ammonium base present in the aqueous organosilicon resin so that the coating composition containing the resin as a binder is likely to become unable to take an aqueous form, hence undesirable. The reaction smoothly proceeds at a temperature of about 20° to about 100° C., preferably about 50° to about 80° C. and is completed in about 30 minutes to about 10 hours.

In this way there is obtained a reaction product of the organosilicon compound of the formula (A) or its low condensate and the organosilicon compound of the formula (B) or its low condensate (high condensation product of organosilicon compounds).

The reaction between the high condensation product of organosilicon compounds obtained above and a tertiary amine compound is carried out by reacting the tertiary amine compound with the glycidyl group present in the high condensation product, whereby the quaternary ammonium base is introduced into the aqueous organosilicon resin. The foregoing reaction can employ a wide range of conventional reaction conditions for reacting a tertiary amine compound with a glycidyl-group-containing compound. For example, the high condensation product of organosilicon compounds is reacted with the tertiary amine compound in the presence of an acid and/or water, examples of the acid being hydrochloric acid, sulfuric acid, phosphoric acid and like mineral acids, formic acid, acetic acid and like organic acids, etc. The tertiary amine compound can be any of those heretofore known which can form a quaternary ammonium base, such as trimethylamine, triethylamine, tri-n-butylamine and like aliphatic tertiary amines, N-methyldiethanolamine, N-dimethylethanolamine, triethanolamine, dimethylaminoethanol, diethylaminoethanol, N,N-dimethylcyclohexylamine and like hydroxyl-containing aliphatic tertiary amines, pyridine, α-picoline, β-picoline, γ-picoline, 2,4-lutidine, 2,6-lutidine and like pyridines, N-methylpiperidine, N-methylpyrrolidine and like heterocyclic amines, etc. Of these tertiary amine compounds, preferred are N-methyldiethanolamine and N-dimethylethanolamine.

The tertiary amine compound, when reacted with the high condensation product of organosilicon compounds, is used in such amount that the quaternary ammonium base is present in the aqueous organosilicon resin in a sufficient amount to dissolve or disperse the resin in an aqueous medium. For example, about 0.001 to about 1.5 moles of the tertiary amine compound is used per mole of the organosilicon compound of the formula (B) constituting the high condensation product. The reaction smoothly proceeds at a temperature of about 20° to about 100° C., preferably about 50° to about 80° C. and is completed in about 3 to about 30 hours.

The reaction conditions in the processes (2) and (3) are the same as those in the process (1).

The quaternary ammonium base-containing aqueous organosilicon resin is thus prepared. The organosilicon resin obtained is a three-dimensional condensation product having a condensation degree of about 20 or more and a molecular weight of about 3,000 or more and is soluble or dispersible in water. By heating the coat formed from the composition, the quaternary ammonium base can be easily removed from the coat due to the thermal decomposition of the base at a low temperature.

The coating composition of the present invention can be prepared by dissolving or dispersing the aqueous organosilicon resin obtained above in an aqueous medium. Examples of suitable aqueous mediums are water, aqueous solvents such as methanol, ethanol, isopropanol, diacetone alcohol and like alcohol solvents, cellosolve, methyl Cellosolve, methyl Cellosolve acetate, butyl Cellosolve and like Cellosolve solvents, mixtures of such solvent and water, etc. Of these mediums, isopropanol and methyl cellosolve are preferred. The organosilicon resin is dissolved or dispersed in the aqueous medium in an amount of about 0.5 to about 40% by weight, preferably about 1 to about 20% by weight, based on the coating composition of the invention. The presence of more than about 40% by weight of the resin tends to impair the storage stability of the resulting coating composition.

The coating composition of the invention can be, of course, formulated as clear type and can be admixed with a coloring agent to provide a colored composition.

The invention will be described below in greater detail with reference to the following Examples to which, however, the invention is limited in no way.

EXAMPLE 1

Into a reactor were placed 47 g of γ-glycidoxypropyltrimethoxysilane, 272 g of methyltrimethoxysilane, 23 g of acetic acid, 18 g of N-dimethylethanolamine and 119 g of water. The mixture was reacted with stirring at a pH of 5.5 and a temperature of 60° C. for 5 hours, giving a transparent reaction product with a viscosity of $A_3$ (as measured by a Gardner-Holdt bubble viscometer). The reaction mixture had a condensation degree of about 50 and a molecular weight of about 3,500. The reaction product was diluted with water to 10 wt. % solids, affording the coating composition of the invention.

The coating composition was applied to a finished mild steel sheet and dried at a temperature of 80° C. for 30 minutes, giving a coat having a gel fraction ratio of 94% (extracted with acetone) and a water absorption of 3% as measured after immersion in water for one week.

The coating composition was applied to a finished mild steel sheet and dried at room temperature for 3 days, affording a coat having a gel fraction ratio of 94% (extracted with acetone).

EXAMPLE 2

Into a reactor were placed 104 g of tetraethoxysilane, 26 g of γ-glycidoxypropyltriethoxysilane, 20 g of methanol, 12 g of N-methyldiethanolamine, 4 g of formic acid and 32 g of water. The mixture was reacted with stirring at a pH of 5.0 and a temperature of 60° C. for 8 hours, giving a transparent reaction product with a viscosity of A. The reaction product had a condensation degree of about 50 and a molecular weight of about 3,500. The reaction product was diluted with water to 10 wt. % solids, affording the coating composition of the invention.

The coating composition was applied to a finished mild steel sheet and dried at a temperature of 80° C. for 30 minutes, giving a coat having a gel fraction ratio of 97% (extracted with acetone) and a water absorption of 5% as measured after immersion in water for one week.

EXAMPLE 3

A low condensation product (trimer on the average) was prepared by heating a mixture of 200 g of diisobutyldipropoxy silane, 18 g of water, 50 g of methyl cellosolve and 0.2 g of sulfuric acid to a temperature of 80° C. for 2 hours.

Reaction was conducted by heating a mixture of 100 g of γ-glycidoxypropyltripropoxysilane, 40 g of N-dimethylethanolamine, 30 g of acetic acid and 5 g of water to a temperature of 60° C. for 3 hours, giving an amine addition product.

There were reacted 268 g of the reaction mixture containing the low condensation product and 175 g of the reaction mixture containing the amine addition product at a pH of 4.0 and a temperature of 80° C. for 5 hours, giving a reaction product with a condensation degree of about 45 and a molecular weight of about 4,000. The reaction product was diluted with water to 10 wt. % solids, affording the coating composition of the invention.

The coating composition was applied to a finished mild steel sheet and dried at a temperature of 80° C. for 30 minutes, giving a coat having a gel fraction ratio of 85% (extracted with acetone) and a water absorption of 3% as measured after immersion in water for one week.

The coating composition was applied to a finished mild steel sheet and dried at room temperature for 3 days, forming a coat with a gel fraction ratio of 85% (extracted with acetone).

EXAMPLE 4

Reaction was carried out by heating a mixture of 236 g of γ-glycidoxypropyltrimethoxysilane, 88 g of N-methyldiethanolamine, 50 g of formic acid and 36 g of water to a temperature of 60° C. for 1 hour.

There was further reacted at a pH of 4.0 and a temperature of 80° C. for 4 hours a mixture of 410 g of the reaction mixture obtained above, 450 g of ethyltrimethoxysilane and 162 g of water, giving a reaction product. The reaction product was found to have a condensation degree of about 45 and a molecular weight of about 4,000. The reaction product was diluted with water to 10 wt. % solids, affording the coating composition of the invention.

The coating composition was applied to a finished mild steel sheet and dried at a temperature of 80° C. for 30 minutes, giving a coat having a gel fraction ratio of 93% (extracted with acetone) and a water absorption of 4% as measured after immersion in water for one week.

The coating composition was applied to a finished mild steel sheet and dried at room temperature for 3 days, forming a coat with a gel fraction ratio of 90% (extracted with acetone).

The coating compositions of the invention obtained in Examples 1 to 4 were stored at 50° C. for one month but were found not to have caused any undesired change.

COMPARISON EXAMPLE

An emulsion of polymethylphenylsiloxane type (10 wt. % solids) was applied also to a finished mild steel sheet, giving a coat which had a water absorption of 17% as measured after immersion in water for one week.

We claim:
1. An aqueous organosilicon resin coating comprising:
   (I) an organosilicon resin which is a condensation product prepared from
       (i) a first component which is at least one member selected from the group consisting of (a) an organosilicon compound represented by the formula

       $$R^1{}_a Si(OR^2)_{4-a} \qquad (A)$$

wherein $R^1$ is a hydrocarbon group having 1 to 12 carbon atoms, $R^2$ is a hydrocarbon group having 1 to 8 carbon atoms and a is 0, 1 or 2, and (b) a low condensate of the organosilicon compound represented by the formula (A);
       (ii) a second component which is at least one member selected from the group consisting of (a) an organosilicon compound represented by the formula

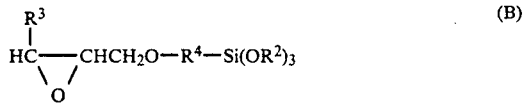

$$\begin{array}{c} R^3 \\ | \\ HC\!\!-\!\!-\!\!CHCH_2O\!-\!R^4\!-\!Si(OR^2)_3 \\ \diagdown\;\;/ \\ O \end{array} \qquad (B)$$

wherein $R^3$ is a hydrogen atom or a methyl group, $R^4$ is a bivalent hydrocarbon group having 1 to 8 carbon atoms, and $R^2$ is as defined above, and (b) a low condensate of the organosilicon compound represented by the formula (B), wherein the first component and the second component are used in a ratio of the former to the latter of 50–99.5:0.5–40 mole %; and
       (iii) a third component which is at least one tertiary amine compound selected from the group consisting of trimethylamine, triethylamine, tri-n-butylamine, N-methyldiethanolamine, N-dimethylethanolamine, triethanolamine, diethylaminoethanol, N,N-dimethylcyclohexylamine, pyridine, α-picoline, β-picoline, γ-picoline, 2,4-lutidine, 2,6-lutidine, N-methylpiperidine, and N-methylpyrrolidine,
   said organosilicon resin containing a quaternary ammonium group which is formed by a reaction of the tertiary amine compound with a glycidyl group in the organosilicon resin; and
   (II) an aqueous medium.

2. A coating composition according to claim 1, wherein the hydrocarbon group having 1 to 12 carbon atoms and represented by $R^1$ in the formula (A) is a member selected from the group consisting of straight chain and branched chain alkyl groups having 1 to 12 carbon atoms, aryl groups having 6 to 12 carbon atoms, and cycloalkyl groups having 3 to 8 carbon atoms.

3. A coating composition according to claim 1, wherein the hydrocarbon group having 1 to 12 carbon atoms and represented by $R^1$ in the formula (A) is a straight chain or branched chain alkyl group.

4. A coating composition according to claim 1, wherein the hydrocarbon group having 1 to 12 carbon atoms and represented by $R^1$ in the formula (A) is an alkyl group having 1 to 4 carbon atoms.

5. A coating composition according to any one of claims 1 to 4, wherein the hydrocarbon group having 1 to 8 carbon atoms and represented by $R^2$ in the formula (A) is a member selected from the group consisting of straight chain and branched chain alkyl groups, aryl groups having 6 to 8 carbon atoms, and cycloalkyl groups having 3 to 8 carbon atoms.

6. A coating composition according to any one of claims 1 to 4, wherein the hydrocarbon group having 1 to 8 carbon atoms and represented by $R^2$ in the formula (A) is a straight chain or branched chain alkyl.

7. A coating composition according to any one of claims 1 to 4, wherein the hydrocarbon group having 1 to 8 carbon atoms and represented by $R^2$ in the formula (A) is an alkyl group having 1 to 3 carbon atoms.

8. A coating composition according to claim 1, wherein the organosilicon compound represented by the formula (A) is selected from the group consisting of tetramethoxysilane, tetraethoxysilane, tetrapropoxysilane, tetrabutoxysilane, tetraphenoxysilane, methyltrimethoxysilane, methyltriethoxysilane, phenyltrimethoxysilane, phenyltriethoxysilane, dimethyldimethoxysilane, diphenyldimethoxysilane, isobutyltrimethoxysilane, isobutyltriethoxysilane, diisobutyldimethoxysilane, diisobutyldipropoxysilane, and ethyltrimethoxysilane.

9. A coating composition according to claim 1, wherein the hydrocarbon group having 1 to 8 carbon atoms and represented by $R^2$ in the formula (B) is a member selected from the group consisting of straight chain and branched chain alkyl groups having 1 to 8 carbon atoms, aryl groups having 6 to 8 carbon atoms, and cycloalkyl groups having 3 to 8 carbon atoms.

10. A coating composition according to claim 1, wherein the hydrocarbon group having 1 to 8 carbon atoms and represented by $R^2$ in the formula (B) is a straight chain or branched chain alkyl group.

11. A coating composition according to claim 1, wherein the hydrocarbon group having 1 to 8 carbon atoms and represented by $R^2$ in the formula (B) is an alkyl group having 1 to 3 carbon atoms.

12. A coating composition according to claim 1, wherein the bivalent hydrocarbon group having 1 to 8 carbon atoms and represented by $R^4$ in the formula (B) is selected from the group consisting of straight chain and branched chain alkylene groups, phenylene, phenylene substituted with one or two alkyl groups having 1 or 2 carbon atoms on the phenyl ring, and cycloalkylene groups having 3 to 8 carbon atoms.

13. A coating composition according to claim 1, wherein the bivalent hydrocarbon group having 1 to 8 carbon atoms and represented by $R^4$ in the formula (B) is a straight chain or branched chain alkylene group.

14. A coating composition according to claim 1, wherein the bivalent hydrocarbon group having 1 to 8 carbon atoms and represented by $R^4$ in the formula (B) is propylene or butylene.

15. A coating composition according to claim 1, wherein the organosilicon compound represented by the formula (B) is at least one compound selected from the group consisting of γ-glycidoxypropyltrimethoxysilane, γ-glycidoxypropyltriethoxysilane, γ-glycidoxybutyltrimethoxysilane, γ-glycidoxybutyltriethoxysilane, γ-glycidoxypropyltripropoxysilane, 3-(2,3-epoxybutoxy)propyltrimethoxysilane, and 3-(2,3-epoxybutoxy)propyltriethoxysilane.

16. A coating composition according to claim 1, wherein the aqueous medium comprises water or a solution comprising water and at least one member selected from the group consisting of methanol, ethanol, isopropanol, diacetone alcohol, Cellosolve, methyl Cellosolve, butyl Cellosolve, and methyl Cellosolve acetate.

17. A coating composition according to claim 1, wherein the amount of the organosilicon resin is about 0.5 to about 40% by weight based on the coating composition.

* * * * *